United States Patent [19]
Douglass et al.

[11] Patent Number: 5,510,859
[45] Date of Patent: Apr. 23, 1996

[54] TUNED SIGNAL DETECTOR FOR USE WITH A RADIO FREQUENCY RECEIVER

[75] Inventors: Ralph G. Douglass, Bensalem, Pa.; Arthur R. Furman, Tinton Falls, N.J.

[73] Assignee: Information Resources, Inc., Chicago, Ill.

[21] Appl. No.: 350,818

[22] Filed: Dec. 7, 1994

Related U.S. Application Data

[62] Division of Ser. No. 98,223, Jul. 27, 1993, Pat. No. 5,404,161.

[51] Int. Cl.$^6$ ............................................... H04N 17/00
[52] U.S. Cl. ..................... 348/731; 348/177; 348/194; 348/605; 348/607; 455/214
[58] Field of Search ................ 380/20; 455/214, 455/226.4, 208, 296, 303; 348/731, 177, 194, 725, 71, 607, 192, 605, 737; H04N 17/00

[56] References Cited

U.S. PATENT DOCUMENTS

| | | | |
|---|---|---|---|
| 4,074,191 | 2/1978 | Jules | 455/226.4 |
| 4,364,094 | 12/1982 | French et al. | 348/194 |
| 4,408,227 | 10/1983 | Bradley | 348/192 |
| 4,700,222 | 10/1987 | Large et al. | 348/192 |
| 5,161,187 | 11/1992 | Kajita et al. | 380/20 |
| 5,319,709 | 6/1994 | Raiser et al. | 380/20 |

FOREIGN PATENT DOCUMENTS

| | | | |
|---|---|---|---|
| 0539173 | 4/1993 | European Pat. Off. | H04N 17/00 |

*Primary Examiner*—James J. Groody
*Assistant Examiner*—Jeffrey S. Murrell
*Attorney, Agent, or Firm*—Fitch, Even, Tabin & Flannery

[57] ABSTRACT

Disclosed is a tuned channel detector which includes a cable path between a radio frequency source and a receiver such as a TV, wherein the radio frequency source passes first through an attenuator and second through a signal selection module comprising two opposing directional couplers and a single-pole/double-throw switch. The channel to which the TV is tuned is determined by measuring the TV's local oscillator signal from the cable which feeds the radio frequency signal to the TV and, additionally or alternatively, by comparing the signal strength of the input and reflected TV carrier signals at and around the channels under test. Signal detection is further enhanced by modulating the signal mixed with the local oscillator with a tone and/or testing only during certain intervals such as the vertical synchronization interval or the power line cycle. A tone detector having a synchronous rectifier is used to detect low level local oscillator signals. Tuned channel detection is further enhanced through the use of artificial intelligence techniques.

9 Claims, 9 Drawing Sheets

FIG. 5A

| CHAN. | CHAN.-2 | CHAN.-1 | ON-CHAN. | CHAN.+1 | CHAN.+2 |
|---|---|---|---|---|---|
| 25 | -10 | -10 | -16 | -16 | -8 |
| 26 | -7.5 | -9.5 | -20 | -11.5 | -7 |
| 27 | -11.5 | -21 | -21 | -10 | -10.5 |
| 28 | -10.5 | -16.5 | -14 | -11 | -12.5 |
| 29 | -10.5 | -15 | -11.5 | -13.5 | -15 |
| 30 | -12 | -10.5 | -11.5 | -17 | -12 |
| 31 | -9.5 | -9 | -15 | -19 | -10 |
| 32 | -7.5 | -10.5 | -18.5 | -13 | -9.5 |
| 33 | -8.5 | -13 | -17.5 | -11 | -11 |
| 34 | -10 | -16 | -12 | -11 | -14.5 |
| 35 | -13 | -12.5 | -10 | -13 | -12 |

FIG. 5B

| CHAN. | REFLECTION |
|---|---|
| 23 | -7 |
| 24 | -5.5 |
| 25 | -4 |
| 26 | -6.5 |
| 27 | -8.5 |
| 28 | -11.5 |
| 29 | -10.5 |
| 30 | -11.5 |
| 31 | -16.5 |
| 32 | -12.5 |
| 33 | -8 |
| 34 | -8.5 |
| 35 | -10.5 |
| 36 | -10.5 |
| 37 | -7 |

FIG. 5C

| CHAN. | CH.-2 | CH.-1 | ON CH. | CH.+1 | CH.+2 | FIG. OF MERIT Fm3 | Fm5 |
|---|---|---|---|---|---|---|---|
| 25 | 3 | 4.5 | 12 | 9.5 | -0.5 | 26 | 29.5 |
| 26 | 2 | 5.5 | 13.5 | 3 | -4.5 | 22 | 28.5 |
| 27 | 7.5 | 14.5 | 12.5 | -1.5 | 0 | 28.5 | 36 |
| 28 | 4 | 8 | 2.5 | .5 | 1 | 11 | 16 |
| 29 | 2 | 3.5 | 1 | 2 | 1.5 | 6.5 | 10 |
| 30 | .5 | 0 | 0 | .5 | -.5 | .5 | 1.5 |
| 31 | -1 | -2.5 | -1.5 | 6.5 | 2 | 10.5 | 13.5 |
| 32 | -4 | -6 | 6 | 5 | 1 | 17 | 22 |
| 33 | 8 | .5 | 9.5 | 2.5 | .5 | 12.5 | 21 |
| 34 | -2.5 | 8 | 3.5 | .5 | 4 | 12 | 18.5 |
| 35 | 5 | 4 | 1.5 | 2.5 | 5 | 8 | 18 |

TUNED SIGNAL DETECTOR FOR USE WITH A RADIO FREQUENCY RECEIVER

This is a continuation of application Ser. No. 08/098,223, filed Jul. 27, 1993, now U.S. Pat. No. 5,404,161 issued Apr. 5, 1995.

BACKGROUND OF THE INVENTION

The present invention relates to tuned channel detection systems and, more particularly, to television signal detection methods and apparatus for determining the channel to which a television receiver is tuned.

For marketing research, program ratings, consumer surveys, and the like, it is often advantageous to determine the channels to which the televisions within a given viewing area are tuned. The motivation and desire for collecting such information is well-known and thus, further elaboration is unnecessary.

Conventional methods for determining the channel to which a television (TV) receiver is tuned involve the detection of the TV's local oscillator signal. The detection of the local oscillator signal in and of itself is old and well-known in the art. The prior art illustrates various apparatus, both invasive and non-invasive to the television receiver circuitry, which have been used as attempts to provide channel detection means which are more robust and less susceptible to a false reading. Enhanced methods are also used in the detection of the TV's local oscillator signal. Non-invasive methods have typically used an antenna tuned to the TV's local oscillator signal, thus no direct physical connection is made to the television. Invasive techniques, on the other hand, typically use a probe to a circuit point within a TV's tuner circuitry or within a set top cable converter box which provides the detector apparatus with a direct connection to the tuner, thus allowing for both the injection and measurement of signals at the tuner or set top converter. While a direct connection makes it easier to detect the local oscillator signal, it is obviously more desirable to use more non-invasive approaches.

Some examples of non-invasive methods for improving the integrity of local oscillator signal detection include such systems as those disclosed in U.S. Pat. No. 4,723,302 issued Feb. 2, 1988 to Fulmer, et al.; U.S. Pat. No. 3,312,900 issued Apr. 4, 1967 to Jaffe; and U.S. Pat. No. 4,577,220 to Laxton, et al.

Fulmer, et al. describe detecting the local oscillator signal of the TV and storing characteristic values of the signal for the fundamental and a plurality of harmonic frequencies of the local oscillator signals which correspond to predetermined channels. The local oscillator signal fundamental frequency and the corresponding harmonic frequencies which are observed are compared to the stored values to identify the tuned channel. The Fulmer system uses an antenna tuned to the local oscillator or, in the alternative, a direct connection to the radio frequency (RF) input cable signal path.

The Jaffe and Laxton systems both use an antenna tuned to the local oscillator signal and placed in the vicinity of the tuner circuitry of the TV set. Since signals from the television line scanning circuitry tend to modulate the local oscillator signal, the Jaffe system extracts the line scanning information from the local oscillator signal to identify the tuned channel. The Laxton system uses a closed loop arrangement to "lock on" the frequency of the detected local oscillator signal.

Notwithstanding the methods and apparatus described thus far, tuned channel detection through the determination of a TV receiver's local oscillator signal frequency remains problematic. The tuners used by the various manufacturers of TVs, video cassette recorders (VCRs) and cable converter boxes (set top converters) naturally have varying characteristics thus making the positioning of an antenna appropriately in the vicinity of the tuner problematic. Moreover, the frequency of the local oscillator signals generated within TVs, VCRs, and set top converters will range, depending upon the tuned channel, from about 100 MHz to 1400 MHz which in and of itself makes detection a considerable task. In any case, the local oscillator signal's location will only be known approximately, and typically it will be a very low level signal buried down in the noise. It may also be difficult to discern local oscillator from the color carrier when they are in close proximity. These factors along with signal interference from other sources make it desirable to provide a tuned channel detection means having greater integrity than that provided by today's systems. To this end, better non-invasive methods for detecting and/or verifying the tuned channel including improved methods of detecting local oscillator signals are desirable.

SUMMARY OF THE INVENTION

Given the difficulties surrounding the initial detection of local oscillator emanating from a TV and then the difficulty in discerning that signal from other signals and background noise, the present invention focuses upon ensuring that the process of tuned channel detection has sufficient integrity by providing not only enhanced methods for detecting the local oscillator signal, but also completely independent means for detecting the channel to which the receiver is tuned. The enhanced techniques used by the present invention for local oscillator detection include: (1) mixing the signal tuned by the local oscillator detection tuner with a frequency modulated (FM) signal of the mixer wherein the modulated signal is that of a tone which may be FM detected and filtered to detect and measure the presence of the TV's local oscillator signal in the presence of high levels of noise; (2) sampling for the measurement of the local oscillator signal only during the vertical synchronization interval (vertical blanking period) during which there is no color carrier present, thus alleviating difficulties associated with discerning the local oscillator from color carrier signals; (3) pulse timing of the vertical synchronization interval information for scrambled channels at a central control computer and conveying such timing information to the remote channel detectors for vertical synchronization interval sampling; and (4) detecting a 60 Hz modulated signal and then sampling for the detection of the local oscillator only at the same point in the power line 60 Hz modulation cycle, thus alleviating the difficulties of detecting the local oscillator signal when it has been modulated by the 60 Hz power line.

Tuned channel detection in accordance with the embodiment may also be performed in response to reflected signals at the radio frequency input of the TV. The signal tuned by a TV exhibits low impedance to the tuned signal at the TV radio frequency input thus resulting in a high return loss ratio, whereas signals not tuned by the TV exhibit low return loss ratios because a majority of their signal energies are reflected back from the TV, because of the high impedance mismatch for non-tuned signals. The differing return loss ratios can be used to identify the particular channel to which the TV is tuned. The return loss computation is a highly reliable method in and of itself for determining the channel to which the TV is tuned. An advantage of using return loss ratios is that the TV carrier signals being measured are high level signals whose frequency is known substantially exactly. Accordingly, since the return loss computation method is independent of the local oscillator detection method, the two methods may be used together resulting in an extremely robust system for tuned channel detection wherein the possibility for a false detection is very remote.

A tuned channel detector in accordance with the embodiment includes a signal path between a radio frequency input and a TV, wherein the radio frequency input passes through a signal selection module comprising two opposing directional couplers and a single-pole/double-throw switch. The radio frequency input may be any radio frequency signal source, including an antenna, a satellite dish, or a cable input from a cable television (CATV) system. The TV receiver as contemplated herein includes not only TVs, but also VCRs and set top converters or with any system having a local oscillator for tuning the front end of a receiver.

The directional couplers are transmission coupling devices for passing either the forward or backward (reflected) signal in a signal path. As described, an embodiment of the signal selection module has two opposing directional couplers such that both the forward and the backward signals are separately passed. The switch is used to select between the forward and backward signals. The ability to select between forward and backward TV signals is used both for local oscillator detection and the return loss computation. For local oscillator detection, the backward signal provides a source of local oscillator signals leaking back from the TV onto the input signal path, and forward signal selection provides the local oscillator detector with the TV carrier signal both for calibration of the detector and for detection of the vertical synchronization intervals. Within the return loss computation the signal selection module provides separate measurement of the incoming (forward) and the reflected (backward) signals.

Alternative embodiments tailored particularly for use with set top converters may use alternative forward and backward signal selection modules because local oscillator signals generated within such converters are at frequencies significantly higher than those generated within a TV or conveyed on the radio frequency signal path. It may also be advantageous to equip a signal selection module intended for use with a set top converter with a block converter between the module's crossover network and switch which shifts the spectrum to the television band.

The channel detector includes a tuner for reception of forward and backward signals and an intermediate frequency (IF) filter narrows the signals from the tuner to a particular frequency range. The resulting signal is then mixed with a signal from a voltage controlled oscillator (VCO) and presented to a narrow band-pass filter allowing detection by an amplitude modulation (AM) detector. This circuitry is used both for the detection of local oscillator and for the detection of incoming and reflected TV signals for the return loss ratio computation. The output of the VCO may also be modulated with a tone which is then detected by a frequency modulation (FM) detector to aid in local oscillator detection. To this end, a tone detector having a synchronous rectifier is used to detect low level continuous wave (CW) signals (herein the local oscillator signal).

In the present tuned channel detector, the channel to which a television receiver is tuned is thus determined by measuring the receiver's local oscillator signal from the signal path which feeds the radio frequency signal to the TV and, additionally or alternatively, by comparing the signal strength of the input and reflected TV carrier signals at and around the particular channel under test (return loss ratios). The ability to detect the local oscillator signal is further enhanced by modulating the signal mixed with the local oscillator with a tone and testing only during certain intervals such as the vertical synchronization interval or the power line cycle. It may be further advantageous to conduct the return loss computation only during particular sampling intervals as well. The integrity of the tuned channel detection is still further enhanced through the use of artificial intelligence techniques.

BRIEF DESCRIPTION OF THE DRAWINGS

FIGS. 5A, 5B, and 5C represent tabular data illustrating the effectiveness of the return loss computation;

FIGS. 6A and 6B are block diagrams illustrating the scrambled channel sampling aspect of the present invention wherein FIG. 6A represents vertical synchronization interval detection and "time stamp" circuitry within the central control computer; and wherein FIG. 6B represents circuitry in a channel detector for the reception and utilization of "time stamp" information with a phase lock loop circuit;

DETAILED DESCRIPTION OF THE PREFERRED EMBODIMENTS

Figure 1:
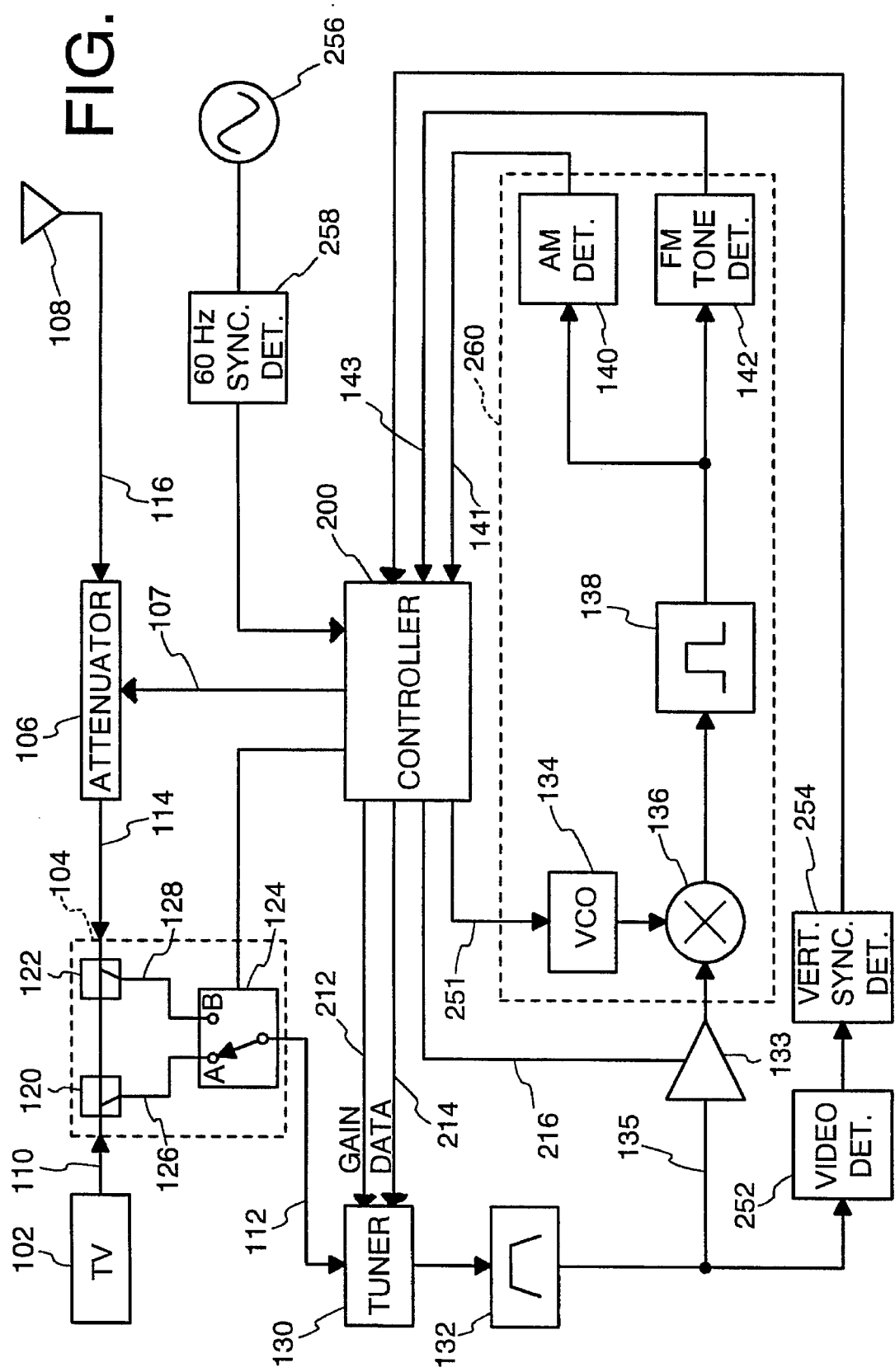
FIG. 1 is a block diagram of a tuned channel detector connected to a television.

FIG. 1 is a block diagram showing a tuned channel detector connected to a TV 102, which represents the user's TV under test. TV 102 is used by the viewer to tune in TV signals received from a radio frequency source 108. As illustrated, radio frequency source 108 is a TV antenna but other radio frequency sources are contemplated. Such additional radio frequency sources include satellite dishes and cable TV inputs. Radio frequency source 108 is coupled to an attenuator 106 by a communication path 116, and the output of attenuator 106 is coupled to a signal selection module 104 via a communication path 114. A communication path 110 couples the radio frequency signals from the signal selection module 104 to the TV 102.

The signal selection module 104 comprises two opposing directional couplers 120 and 122 and a single-pole/double-throw switch 124. A portion of signals reflected or radiated from receiver 102 on communication path 110 are coupled by directional coupler 120 and presented to a pole "A" of switch 124 via path 126. A portion of input signals from radio frequency source 108 are coupled by directional coupler 122 to pole "B" of switch 124 through path 128.

Switch 124 is used to connect either the signal on path 126 or path 128 to a detector tuner 130 of the channel detector apparatus via path 112.

The detector tuner 130 is a TV tuner which actually comprises its own local oscillator, a mixer, and an output filter (not shown). The detector tuner 130 is used to select portions of television signals on path 112 for analysis by later circuitry as is described in detail later herein. The output bandwidth of detector tuner 130 is typically about 6 MHz from about 41 MHz to 47 MHz. One such tuner is Phillips model UV936, which covers the spectrum from about 50 to about 800 MHz.

Detector tuner 130 presents selected radio frequency signals at an intermediate frequency of 44 MHz. The output of detector tuner 130 is further filtered by an IF filter 132 which has a bandwidth of approximately 1 MHz with cutoff frequencies at about 43.5 and about 44.5 MHz. The passband of IF filter 132 thus passes the signals selected by detector tuner 130 as an intermediate frequency signal at 44 MHz.

The output of IF filter 132 is applied to a signal path 135 and is amplified by an IF amplifier 133. In one embodiment, a Motorola MC 1350 video amplifier was used as IF amplifier 133. The resulting signal and the output of a voltage controlled oscillator (VCO) 134 are then mixed in a mixer 136. The output signals of mixer 136 are connected to a very narrow band-pass filter 138 (e.g., a 10.7 MHz bandpass crystal filter having a 15 KHz bandwidth), which in turn presents its output to an AM detector 140 and a FM tone detector 142. While the bandpass filter 138 used in the preferred embodiment is a 10.7 MHz crystal filter, other types of filters at other frequencies may also be practical for use within alternative embodiments. Taken together VCO 134, mixer 136, band-pass filter 138, AM detector 140 and FM tone detector 142 represent an AM and FM fine tuning receiver which is enclosed by a dashed box labeled 260.

A controller 200 is used to control the apparatus. The controller 200 could be a human operator, but in the present example is a microprocessor controlled computing arrangement as discussed below. Various control paths are used by the controller 200 to control the apparatus. A switch control path 125 allows the controller to change the position of the switch 124 between its "A" and "B" positions to select signals either from the source 108 or the TV 102 for presentation on path 112. A gain control path 212 and a data control path 214 control the detector tuner 130 to select the particular frequency bands from the signals on path 112 and regulate the amplitude of the selected signals. A control path 216 controls the gain of the IF amplifier 133, and a signal on control path 251 controls the output of VCO 134. The controller 200 also receives input signals from an AM detect signal path 141 and a FM detect signal path 143 which are used as described below.

It should be appreciated that the apparatus described herein selects from the input radio frequency signal path which feeds radio frequency signals to the TV 102 thus providing access to various input radio frequency signals as well as reflected and leaked signals propagating backwards from the TV 102 along the input signal path. The apparatus of FIG. 1 is used to detect and measure incoming and reflected TV picture carrier signals and to detect and measure the local oscillator signals leaking out from the TV 102. Such detected and measured signals are used to identify which of a plurality of television channels the TV 102 is tuned.

The TV 102 includes a local oscillator (not shown) which generates a signal having a selected one of a plurality of frequencies necessary to produce a 45.75 MHz intermediate frequency signal representation of a tuned channel signal within TV 102. The particular television local oscillator frequency needed by the TV 102 to receive each television channel is substantially the same from receiver to receiver and well-known. Since a portion of this local oscillator signal leaks out onto the input path 110, the local oscillator signal's frequency may be detected for the purpose of determining the channel to which the TV 102 is tuned. The local oscillator leakage signal can be quite small and may be buried in a high level of noise and/or TV carrier and sideband signals. The embodiment may be reliably used to detect a television local oscillator signal even when the local oscillator leakage signal level is well below the noise level. Moreover, as will be appreciated by those skilled in the art, the above may also be used to detect any low level continuous wave (CW) signal in high noise levels.

To perform local oscillator detection, the controller 200 puts the switch 124 in its "A" position to select backward propagating signals from TV 102. It is advantageous to attenuate the radio frequency source signal delivered to the TV 102 to a level no larger than necessary to receive a clear picture so that the local oscillator signal from the TV 102 is not completely masked. By attenuating the source signal, one can find the frequency location of a very low level local oscillator signal which might otherwise be lost in the source signal and its reflection. Attenuator 106 is provided for this purpose, and it may be fixed, switchable or variable via control path 107.

The controller 200 implements local oscillator detection of signals on path 112 by stepping the selection performed by detector tuner 130 from one expected local oscillator frequency to another until a local oscillator signal is detected at the output of the detector tuner 130. The controller 200 controls the detector tuner 130 to nominally place an expected local oscillator frequency at about 44 MHz and the selected signal is connected to mixer 136 via the filter 132 and IF amplifier 133. Controller 200 then controls VCO to apply a signal to mixer 136 having a frequency which will center the expected frequency from detector tuner 130 in the passband of band-pass filter 138.

Local oscillator signals, although generally known, can vary depending upon the particular TV 102 under test. In order to cover the range of possible signals, the VCO 134 is presented by controller 200 with a sweep voltage at its input which causes a sweep of frequencies from the VCO 134 to allow for some deviation of the local oscillator signals from their nominal 44 MHz while still providing for accurate detection within the swept frequency range. Frequency sweeping also allows for fairly wide tolerances in the design of the mixer 136. Since the expected local oscillator signal is received at approximately 44 MHz, the frequencies from the VCO 134 necessary to drive a 10.7 MHz output at mixer 136 comprise a frequency sweep in the vicinity of 33.3 MHz.

There are five (5) possible modes of local oscillator testing which may be used by the tuned channel detector apparatus. The modes of local oscillator testing, in order of increasing testing time, are: (1) amplitude testing; (2) tone testing; (3) sampling testing; (4) line synchronization sampling; and (5) scrambled channel sampling. Advantageously, the testing modes may be used individually or in combination.

When using amplitude testing to detect local oscillator, the controller 200 tunes detector tuner 130 to the proper frequency, provides the appropriate VCO 134 output signals, and searches a narrow spectrum at the output of band-pass filter 138 for a signal at the appropriate local oscillator frequency. The AM detector 140 is used to detect a signal which matches the expected local oscillator signal to within some predetermined tolerance of amplitude and frequency.

Tone test is used if the amplitude of the local oscillator is so low that it cannot be reliably differentiated from the reflected "noise" by the AM detector 140. Tone detection is performed by FM modulating the signal generated at VCO 134 prior to mixing that signal with the incoming signal from detector tuner 130 at mixer 136. Using a combination of audio filters and a synchronous tone detector, a local oscillator signal can be reliably detected even in the presence of significant noise. This is so because an FM signal, when mixed with noise, will produce more noise. However, the presence of a continuous wave local oscillator signal even buried deep below the noise level, will result in a tone which, with proper filtering, can be detected. Controller 200 generates the tone used for the FM modulation by varying the VCO 134 control signal on conductor 251. When the FM modulated signal from VCO 134 is mixed at mixer 136 with an incoming expected local oscillator signal, an FM modulated 10.7 MHz signal will result. The FM tone detector 142 is used to detect the tone in the 10.7 MHz signal.

The sampling test may be used with either the amplitude or tone modes of testing. Sampling is used because the local oscillator signal required to tune the majority of TV channel signals lies in the vicinity of the color carrier signal of the channel which lies seven (7) channels above the channel in question. Of course, when no TV channel exists seven channels above the channel in question, then interference is not an issue. In theory, the color carrier of the interfering channel will be 170 KHz away from the expected local oscillator signal of the channel in question. However, while amplitude detection should be adequate if the local oscillator signal level is larger than the reflected color carrier, due to real world tolerances the local oscillator could be confused with the color carrier or its sidebands if the local oscillator signal level is smaller than the color carrier. In order to avoid possible confusion between an expected local oscillator signal and a possibly interfering color carrier signal, the expected local oscillator signal can be sampled during the vertical retrace interval of the possibly interfering channel (vertical blanking) when the color carrier is not present. Thus, if one looks for local oscillator only during the vertical retrace interval of the interfering channel, typically seven channels above the channel in question, then the local oscillator signal of the channel in question cannot be confused with the color carrier of the interfering channel. The vertical synchronization or retrace interval is only about 1.2 milliseconds, thus it takes successive samples using a sample-and-hold technique and signal integration to get a reliable reading. Hence, it takes longer to get a reading with vertical synchronization interval sample than with the methods of testing discussed thus far, but vertical synchronization interval testing is no less reliable.

With the switch in position "B" and the detector tuner 130 tuned to the interfering channel (where the local oscillator of the channel in question would lie), the proper vertical synchronization interval can be extracted to determine the correct sampling interval corresponding to the vertical synchronization interval. A video detector 252 is provided to convert the non-baseband output of IF filter 132 via signal path 135 to composite video which is then presented to vertical synchronization interval detector 254 which provides vertical synchronization interval information to controller 200. The controller 200 uses vertical synchronization interval detector 254 to determine the vertical synchronization interval rate and then software is used to generate a "pseudo-sync" for use during the sampling mode. Video is turned off (switch 124 position changed to "B") after "pseudo-sync" is established.

Occasionally the local oscillator of a TV 102 will be modulated by the 60 Hz power line signal to such an extent that the local oscillator will "sweep" through a narrow band of frequency and thus a steady level cannot be maintained for measurement. The presence of the 60 Hz modulation of a local oscillator signal may be detected by the controller 200 from signals on path 141 at the output port of AM detector 140. Once detected, the 60 Hz synchronization sampling method may be used by determining the 60 Hz synchronization from a 60 Hz synchronization detector 258 connected to a 60 Hz power source 256. 60 Hz sampling can be used to sample the modulated local oscillator signal at the same location in its "sweep," and then integrate the results similarly as previously described for vertical synchronization interval sampling using sample-and-hold and signal integration techniques.

The 60 Hz and vertical synchronization interval signals (the "sampling" test methods) are used for performing sampled tuned channel detection methods only during the 60 Hz and vertical synchronization interval sample periods. When no local oscillator signal is detected at an expected frequency, the controller 200 re-tunes the detector tuner 130 to select a new expected local oscillator signal and the above tests are again performed.

The present embodiment may also be used to detect a tuned channel by determining the return loss in reflected television signals. Since a receiver exhibits matched impedance to a tuned signal while exhibiting mismatched impedance to signals not tuned at the radio frequency input, the result is high return loss for tuned signals and low return loss for non-tuned signals, because a majority of their energies are reflected back from the receiver due to the high impedance mismatch for non-tuned signals. Differing return loss ratios are thus used to identify the particular channel to which the TV 102 is tuned, as will now be described.

The expected return loss of each tuned channel can be used in a return loss tuned channel detection method to identify the tuned channel of a receiver. Prior to performing tuned channel detection using the return loss method, a profile of the return loss characteristics of a receiver is created and stored in controller 200. At its very simplest, the return loss profile would consist of a value representing the reflected picture carrier signal strength measurement for each possible tuned channel. (Other components of the television signal might also be used.)

The tuned channel detection method then successively tunes detector tuner 130 to select the picture carrier of possible tuned channels and compares the measured reflected picture carrier signal strength value with the stored profile. When the measured value matches a value stored in the profile of controller 200, a likely tuned channel has been identified.

More complex expected signal profiles, as discussed below, may be produced and stored to improve the certainty of channel detection. Further, such profiles may be stored in controller 200 during manufacture or the profile may be learned by the tuned channel detector during setup operations when the channel detector apparatus is first connected to TV 102. In the latter "learning" case, an operator or automated equipment would tune the TV 102 to successive channels and allow the detector apparatus to measure and store the necessary values at each tuned channel to create the profile.

To prepare a profile, attributes are determined for the measured differences between the forward and backward signal strengths for one or more picture carrier signals at and adjacent to the channel being tested. The controller 200 accomplishes this by placing switch 124 in position "A" for backward signal selection and position "B" for forward signal selection. By comparing the forward signals with the backward signals, a coefficient which can be stored as an "attribute" for the particular signal is computed for later channel identification. Once attributes are determined for a particular channel, the TV 102 channel is changed to the next channel and the controller 200, having been notified that the next channel is tuned, then determines the attributes for the next channel as described. Once stepping through all channels and once the controller 200 has attributes for all channels, then the controller 200 compiles a TV profile from the channel attributes. FIGS. 5A, 5B, and 5C represent values accumulated in preparing such a profile.

In FIGS. 5A, 5B and 5C, the data illustrated in tabular form was obtained with a tuned channel detector by measuring the difference between the incoming picture carriers and their reflection (in db) from the TV 102 receiver (herein Sylvania Model #19C 518). The TV 102 was tuned to channel 25 through channel 35, and then the signal reflections were measured for the tuned channel and the two adjacent upper and lower channels. This data would be "learned" by the system and would become the "attributes" of the TV 102 under test. The data collected are shown in part in FIG. 5A.

With the "learned" profile generated for all channels, the controller 200 may test channels sequentially by measuring the profiles for all channels being tested by looking for a match with the profiles in the "learned" table for all channels; if the profiles do not match for an individual channel, then the next channel in sequence is tried. A "figure of merit" is determined for differences between learned and measured values. The channel having the lowest "figure of merit" is picked as the tuned channel. Once the measured profile matches the learned profile, the tuned signal is detected.

Measuring the detection of one or more adjacent signals will improve the chances of a correct detection in accordance with this method. It has been determined that reliable channel detection may be performed using return loss where only one or two adjacent signals are measured in addition to the signal under test. This is done, for example, by measuring the two lower adjacent signals, the two upper adjacent signals and the signal being tested (five signals in total). Note that "adjacent" signal means adjacent in signal frequency and not necessarily in channel number. Thus, Channel 13 is adjacent to Channel 23, not 14, as is understood by those skilled in the art.

Return loss testing may also be used with either the 60 Hz or vertical synchronization sampling modes. In fact, since a constant picture carrier signal ensures more accurate return loss ratios, it is desirable to use vertical synchronization sampling while computing return loss ratios. In this regard, it should be noted that vertical synchronization sampling is actually different when done for return loss than when done for local oscillator testing. In particular, with return loss testing, the vertical synchronization is derived from the channel being tested rather than some interfering channel. Since the channel picture carrier itself, as opposed to the corresponding local oscillator, is the signal which is being tested, there is no interfering channel. The sampling is used to ensure fairly constant picture carrier measurements because no picture level information is present during vertical retrace.

Figure 2:
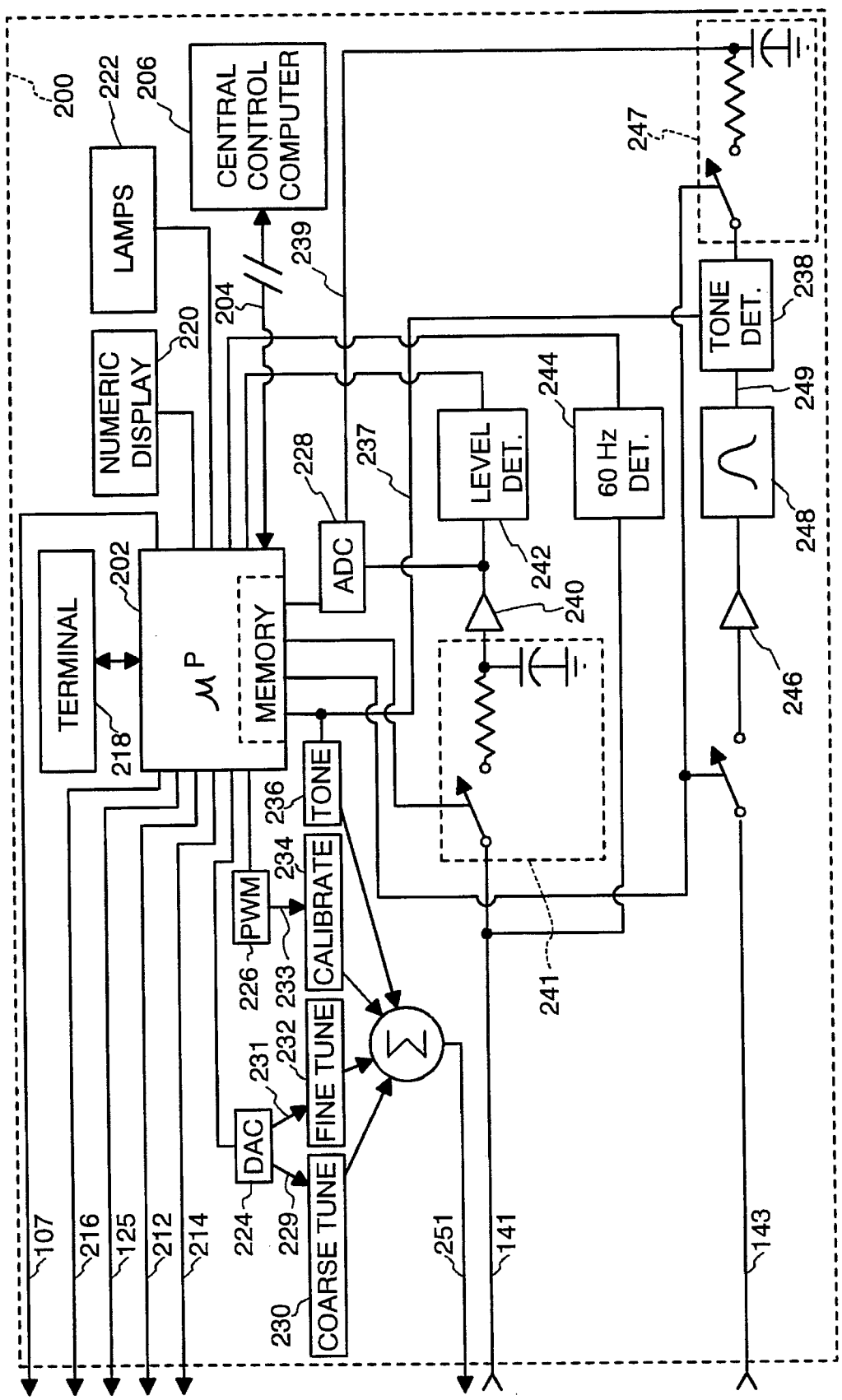
FIG. 2 is a more detailed block diagram relating to the controller used with the tuned channel detector.

FIG. 2 illustrates controller 200 which includes a microprocessor 202. Microprocessor (μP) 202 is connected to the basic apparatus of the tuned channel detector for controlling various portions thereof. The SIGNETICS 80C552 microcontroller has been used in the preferred embodiment as microprocessor 202. A detailed description of the instruction set, interfacing requirements, etc., can be found in the SIGNETICS (Phillips) Data Book "80C51-based 8-bit microcontrollers." The microprocessor 202 is, of course, associated with read only memory (ROM) and random access memory (RAM) components and appropriate interface circuitry (not shown), all of which may be incorporated within microprocessor 202.

The microprocessor 202 is connected to an optional terminal 218 which may be used for manual operation of the detector at a remote location primarily for testing the apparatus and for controlling manual learning. Optionally, controller 200 may include an LED numeric display 220 which provides an indication representing the channel to which the TV 102 is tuned, and various colored lamps 222 which indicate apparatus' mode and operating conditions.

A data path 204 connects microprocessor 202 with a central control computer 206. Generally, the public telephone network and modems are used for data path 204 between microprocessor 202 and central control computer 206. Industry standard RS-232 communication protocols and circuitry are provided to interface the microprocessor 202 to the terminal 218 and data path 204. Dedicated RS-232 driver/receiver chips are readily available for this purpose. Input and output (I/O) ports are available on the microprocessor 202 for sending and receiving data to and from various portions of the subject channel detector apparatus.

The control voltage presented to VCO 134 via path 251 is a summation of several voltage sources controlled by microprocessor 202. "Coarse tune" voltage source 230, "fine tune" voltage source 232, "calibrate" voltage source 234 and "tone" signal voltage source 236 are all summed together at summing junction 250 which provides the input voltage to VCO 134. Coarse tune voltage source 230 and fine tune voltage source 232 are controlled at separate outputs of a digital to analog converter (DAC) 224, output paths 229 and 231 respectively which may be external to and controlled by the microprocessor 202 or incorporated within microprocessor 202.

Coarse tune voltage source 230 presents a voltage to the VCO 134, placing the selected signal output from mixer 136 generally in the vicinity of bandpass filter 138. Fine tune voltage source 232 steps in voltage steps at ⅕ that of coarse tune voltage source 230 and fine tune voltage source 232 is used under control of microprocessor 202 to provide the sweep voltage at VCO 134. Calibrate voltage source 234 provides under control of microprocessor 202 a temperature compensating voltage component which is driven via signal path 233 by pulse width modulator (PWM) 226. PWM 226 may also be incorporated within microprocessor 202. The tone voltage source 236 may be any tone used for frequency modulating the output of the VCO 134. A control path 237 is also provided to tone detector 238 and microprocessor 202 to facilitate tone detection.

The AM detected output from the fine tuning receiver 260 on path 141 is received by controller 200 and amplified by an amplifier 240. A sample-and-hold 241 having a microprocessor controlled solid state switch is used to sample the detected signal prior to amplification. The output of amplifier 240 is presented at an analog to digital converter (ADC) 228, a level detector 242, and a 60 Hz detector 244. ADC 228 provides digital representations of analog inputs. The level detector 242 is typically implemented as a comparator circuit and accordingly, sends a signal to microprocessor 202 when a predetermined threshold level has been passed. 60 Mz detector 244 is typically implemented as a tone detector circuit, such as that provided by the LM567 chip, the output of which sends a signal to microprocessor 202 indicating the presence of a 60 Hz tone. The detection of the 60 Hz tone is used by microprocessor 202 to determine whether to use the 60 Hz line synchronization sampling mode.

The output signals from FM tone detector 142 on conductor 143 are sampled with sample-and-hold 247, then amplified by an amplifier 246 and presented to a filter 248 which is a narrow band-pass filter at 10 KHz for use with the "tone testing" method wherein the tone generated at tone voltage source 236 is 10 KHz and the tone detected at tone detector 238 is also 10 KHz. The output of filter 248 is presented to tone detector 238 via signal path 249. The output of tone detector 238 is then presented to ADC 228 via signal path 239. ADC 228 thus provides at least two input channels, one for the amplified AM detected signal from amplifier 240 and one for the output of tone detector 238. Although shown as a separate circuit, ADC 228 may also be incorporated within microprocessor 202.

Figure 3:
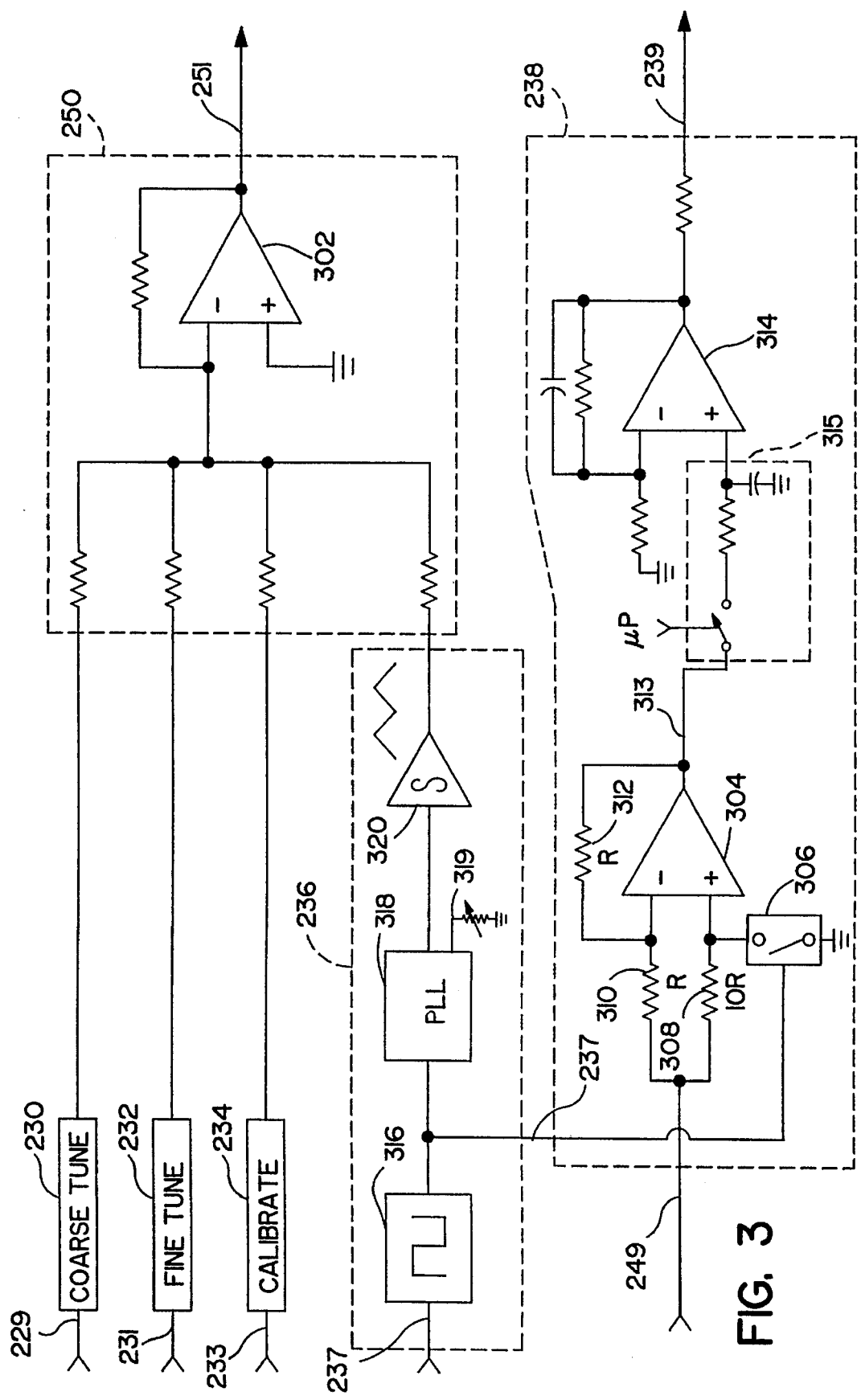
FIG. 3 is a combined block diagram and schematic diagram of a portion of the tuned channel detector.

In FIG. 3, the generation of tone voltage source 236 summing junction 250 and the tone detection circuitry are shown in more detail. The summing junction 250 is implemented by an operational amplifier 302 which receives at its inverted input the sum of the signals from coarse tune voltage source 230, fine tune voltage source 232, calibrate voltage source 234 and tone voltage source 236. The output signals from amplifier 302 are presented to VCO 134 via conductor 251.

The signal from tone voltage source 236 is presented to summing Junction 250 as a triangle waveform, though a pure sinusoid would also work. To generate the triangle waveform, a signal from square wave source is presented to a phase lock loop (PLL) 318 and variable resister 319 which act as a phase shifter to adjust the phase of the square wave. The output of PLL 318 is presented to integrator 320 which provides a triangle waveform at its output. The tone detector 238 comprises two parts, namely a synchronous rectifier operational amplifier 304 (also known as a "locking amplifier") and a filter/sample-and-hold implemented with an operational amplifier 314 and sample-and-hold 315 under microprocessor control. The synchronous rectifier output is analog to digital converted at ADC 228.

The synchronous rectifier provided at operational amplifier 304 has unity gain (+1) when switch 306 is opened and a gain equal to −1 when switch 306 is closed. The respective gain from operational amplifier 304 is provided by making resistor 310 and resistor 312 equal to one another and by making resistor 308 equal to ten times that of resistor 310 or 312. The synchronous rectification is controlled at switch 306 by the square wave source 316 via control path 237. Phase lock loop (PLL) 318 ensures that the rectification timing is aligned with the triangle wave output of tone voltage source 236. The PLL 318 is adjusted to produce maximum in-phase output with the tone signal. More particularly, unity gain is provided by the synchronous rectifier when the triangle wave is positive and −1 gain is provided when the triangle wave is negative.

In one embodiment, the square wave source 316 is provided by a 500 KHz square wave source divided by 50 to provide a 10 KHz square wave output. The PLL 318 is implemented with a LM567 tone decoder and used as a phase adjuster. The integrator 320 may be readily implemented with an operation amplifier, the design of which is well-known in the art. Similarly, the filter/sample-and-hold configuration implemented by operational amplifier 314 and sample-and-hold 315 are also well-known in the art.

The "tone test" is carried out with the above-described tone detection circuitry as follows. First, the tone voltage source 236 is enabled by microprocessor 202 to provide a 10 KHz tone to summing junction 250. The output of summing junction 250 is then applied to VCO 134 via path 251. In response to the signal on path 251, VCO 134 generates an FM modulated output signal which is mixed in mixer 136 with the signal selected by detector tuner 130. When the selected signal is mixed with the incoming local oscillator (e.g., a continuous wave signal from a TV or VCR), an FM modulated 10.7 MHz signal will result when the output of mixer 136 is converted to that frequency. Using a combination of audio filters and a synchronous tone detector, a local oscillator signal can be reliably detected even in the presence of significant noise, since noise will not produce a tone and hence will not produce an output from the synchronous rectifier.

An FM discriminator or slope detection on the steep crystal skirt can be used to detect the 10.7 MHz intermediate frequency signal. In an alternative embodiment of the tuned channel detection apparatus, the 10.7 MHz crystal filter design was eliminated by using a double conversion frequency shift keying (FSK) chip where filtering could be done at 455 KHz using inexpensive ceramic filters. In addition, as should be appreciated by those skilled in the art, the tone injection method of discerning a low level continuous wave signal is not limited to a particular application, and thus may be useful to detect any low level continuous wave signal, not just local oscillator signals.

When the synchronous rectifier output of the operational amplifier 304 of tone detector 238 is synchronized with the tone voltage source 236, the amplified and filtered signal appearing at the input to the synchronous rectifier from filter 248 is a distorted sine wave plus noise if a local oscillator signal to be detected is present. Alternatively, when no local oscillator signal is present, only noise will be presented from the output of filter 248. When the fundamental of the distorted sine wave signal is in phase with the synchronous rectifier, the result at signal path 313 will be a full wave rectified signal. This occurs because when the incoming sine wave goes positive during one-half the cycle, the gain is +1 resulting in a positive going half cycle and during the second half cycle the sine wave goes negative but the gain is also −1 resulting in another positive half cycle, hence a full wave rectified output is produced. Note that any noise, even though it may be significantly larger than the continuous wave signal, will not result in rectification since it is random in phase and frequency relative to the operation of the synchronous rectifier operation of operational amplifier 304.

Figure 4:
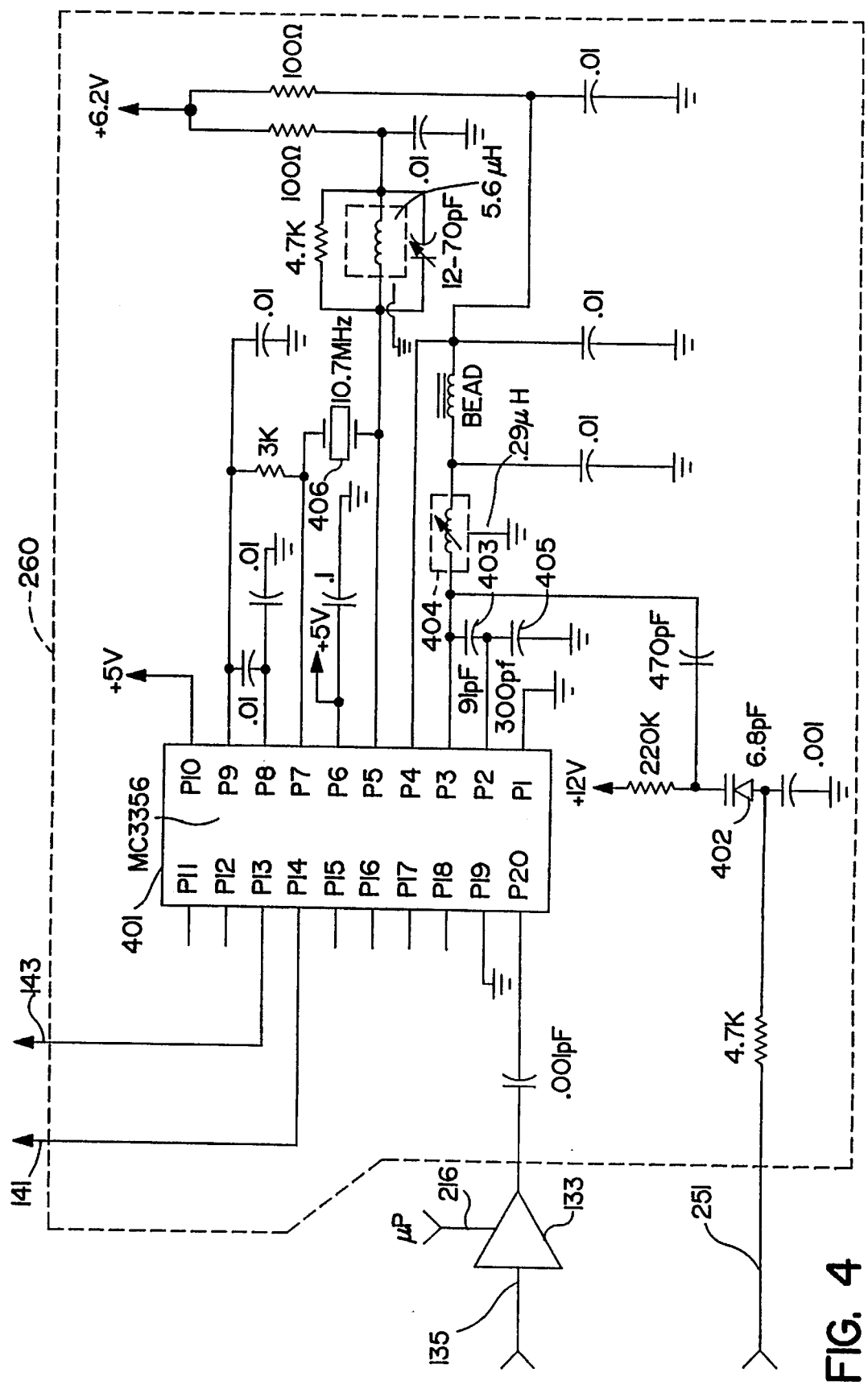
FIG. 4 is a combined block and schematic diagram illustrating an implementation of the signal mixing, filtering and AM/FM detection receiver.

FIG. 4 shows an embodiment of the fine tuning receiver 260. As illustrated, all functions of the fine tuning receiver 260 are implemented by a single FSK receiver chip 401. In the embodiment of FIG. 4, the FSK receiver chip 401 is a Motorola MC3356 data receiver which includes a front-end mixer/local oscillator. Tuning of the VCO 134 frequency is provided from the voltage at summing junction 250 which is applied to varactor diode 402. The resultant capacitance changes of varactor diode 402 affect a tank circuit implemented with capacitor 403, capacitor 405, and inductor 404, which controls the oscillator output frequency. The 10.7

MHz filter is implemented with crystal 406. The resulting 10.7 MHz bandpass filter has a 15 KHz bandwidth. As implemented, the VCO 134 is provided by varactor 402 wherein the local oscillator may be tuned over a narrow range (approximately 500 KHz). A second varactor (not shown) may be used for additional temperature calibration. FM detection as implemented by the MC3356 chip is based on using slope detection via the steep skirt of the 10.7 MHz crystal.

FIG. 5B shows the results of tuning the TV 102 to channel 30 while the reflections for channels 23 through 37 were measured. Of course, in actual operation a complete table for all channels on the system would be generated for use by the tuned channel apparatus. Then, by looking at each channel under test starting at channel 25 and comparing the channel signal plus the two adjacent upper and lower channel signals with the known "attributes" (FIG. 5A), the controller 200 generates an "error" table as illustrated in FIG. 5C.

As an example of such "attributes", assume channel 25 is being tested. If channel 25 were the correct channel for reflections for the carriers for channels 23, 24, 25, 26 and 27 should be −10, −10, −16, −16 and −8 respectively (see FIG. 5A). However in the instant example, the actual measurements were −7, −5.5, −4, −6.5 and −8.5 respectively (see FIG. 5B). The resulting errors: 3, 4.5, 12, 9.5 and −0.5 are tabulated in FIG. 5C. By comparing the errors, the controller 200 can calculate a "figure of merit" by summing the absolute values of all the errors. As illustrated in FIG. 5C, Fm3 sums the "test" channel plus each adjacent signal (3 values) and Fm5 uses two adjacent signals (5 values). Alternative "figure of merit" computations could be used for Fm7 or Fm9 and so on. These are very simple arithmetic operations and can be done relatively quickly by the controller 200, once tabular data such as illustrated in FIG. 5B is generated.

The controller 200 then looks to FIG. 5C and scans the Fm3 or Fm5 columns for the lowest figure of merit, the tuned channel is clearly channel 30 which is the correct channel. Note however, that the best returned loss occurs on channel 31 not channel 30 in FIG. 5B. This is not uncommon and it illustrates that using adjacent signals improves the accuracy of the return loss method.

The return loss method may be used by itself or in conjunction with an local oscillator detection method. Each of these methods vary in speed and accuracy depending upon the particular signal and conditions. Thus, artificial intelligence techniques have been found useful in determining which method to use for particular signals.

Certain channels are sent in a scrambled mode. When the local oscillator to be detected lies within the spectrum of an interfering scrambled channel, the vertical synchronization interval may not be detected from the scrambled signal because a common technique for scrambling a channel is to suppress the synchronization interval information. The synchronization interval information could be recovered by each channel detection arrangement, however, providing such will add to the system cost. Circuitry for communication of such information over a cable such as data path 204 provides a less expensive solution, the circuitry extracts the synchronization interval information at the "head end" via a de-scrambler converter controlled by the central control computer 206. The synchronizing information for scrambled channels is then conveyed to the individual channel detector units over the data path 204.

Figure 6A:
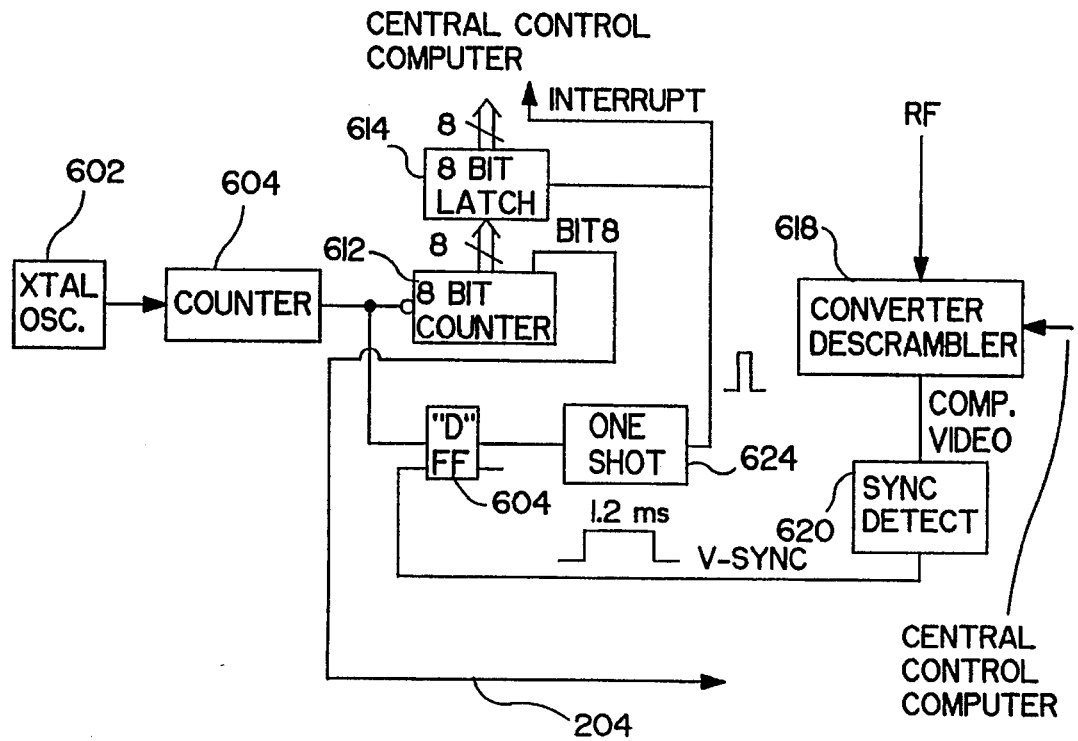
Figure 6B:
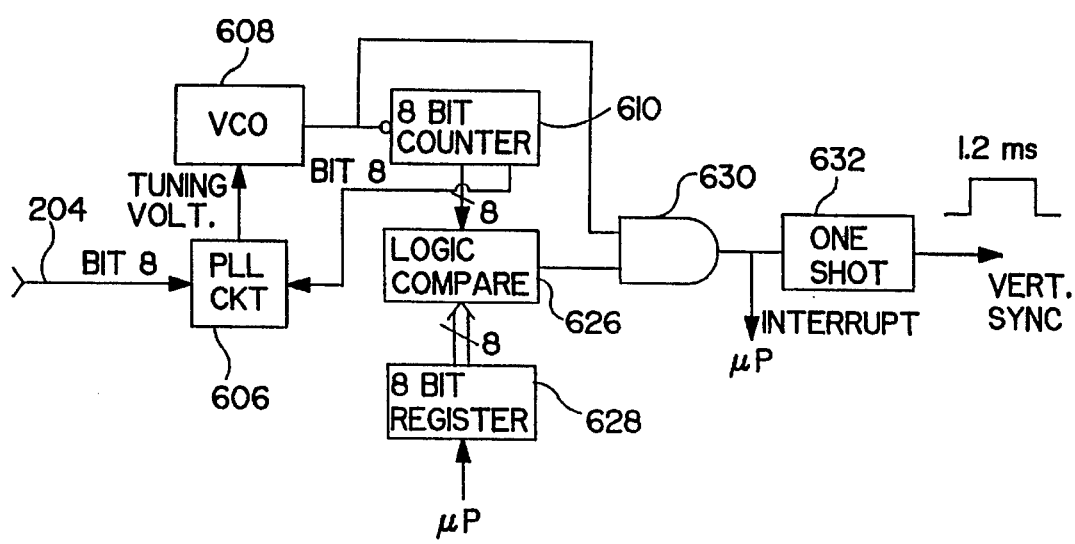

FIG. 6A represents circuitry at the head end associated with central control computer 206, and FIG. 6B represents circuitry used by the microprocessor 202 at the remote detector. A precision 60 Hz clock signal is derived from a crystal oscillator 602 at the head end. Each of the remote channel detectors generates clock signals which are synchronized or "locked" to the central clock signals using a standard phase-lock loop (PLL) circuit 606. The PLL 606 compares a "reference" frequency from a VCO 608 with synchronizing information from the data path 204 and then derives a frequency using digital counter 610. The phase relationship of the two frequencies is analyzed, resulting in a correction voltage that tunes the VCO 608 such that the frequencies at the head end and in the channel detector "lock" in both frequency and phase. The "reference" can be broadcast over data path 204 or over a separate data channel to all remotes. There will, of course, be a transport delay, but this same delay also applies to the TV signals so proper synchronization is maintained.

At the central control computer 206, composite video signal is detected with a converter de-scrambler 618. Vertical synchronization interval information is then extracted from the scrambled signal with synchronization interval detector 620. A flip-flop 622 triggers a 1.2 millisecond pulse from one-shot monostable 624 corresponding to each vertical synchronization period. The 1.2 millisecond pulse interrupts the central control computer 206 and latches the current clock count of a counter 612 in a latch 614. The central control computer 206 periodically tunes to each scrambled channel, establishes a "time stamp" relative to its clock (and hence the remote clocks), adds a "correction" input value to compensate for any communications protocol delay in order to maintain constant delays, and finally transmits this information to the microprocessors 202 at the remotes. Since there will be a slow "drift" input error, an updated "time stamp" input should be sent periodically, typically every five to ten seconds. The update period can be extended significantly if the central control computer 206 calculates the "drift rate" for each channel and transmits this information to the remotes, thus allowing the microprocessor 202 to compensate for the drift at the remote units.

At the remote units, as illustrated in FIG. 6B, a closed loop maintains the phase relationship between the central control computer 206 and the remote units, wherein PLL circuit 606 drives VCO 608, which drives counter 610 which, in turn, closes the loop to PLL circuit 606. Logic compare 626 conveys phase information to microprocessor 202 via 8-bit register 628. The VCO 608 output is ANDED with the logic compare 626 at AND 630, which, in turn, provides an interrupt signal to the microprocessor 202 and generates a 1.2 millisecond vertical synchronization interval pulse at the remote unit, with one-shot monostable 632, thus providing vertical synchronization interval information for the scrambled channel which was decoded at the central computer 206 and which is now in synchronization interval with the synchronization interval pulses generated for sampling at the remote tuned channel detector units.

Another approach for conveying the synchronizing information with respect to scrambled channels would use a reference channel (e.g., channel #6), and then have the head end broadcast reference time shifts (±Δ) and drift rate relating the reference channel to the scrambled channel synchronizing information for use at each remote unit from time to time as required. This reference channel approach avoids additional phase lock circuitry.

The preceding embodiment involves a tuned channel detector connected directly to the RF input of a TV 102 and uses a detector tuner 130 capable of detecting local oscillator signals generated by a television receiver. When a set top converter is inserted between the TV 102 and the tuned channel detector, it is the local oscillator of the set top converter which must be analyzed to identify a tuned channel.

Figure 7:
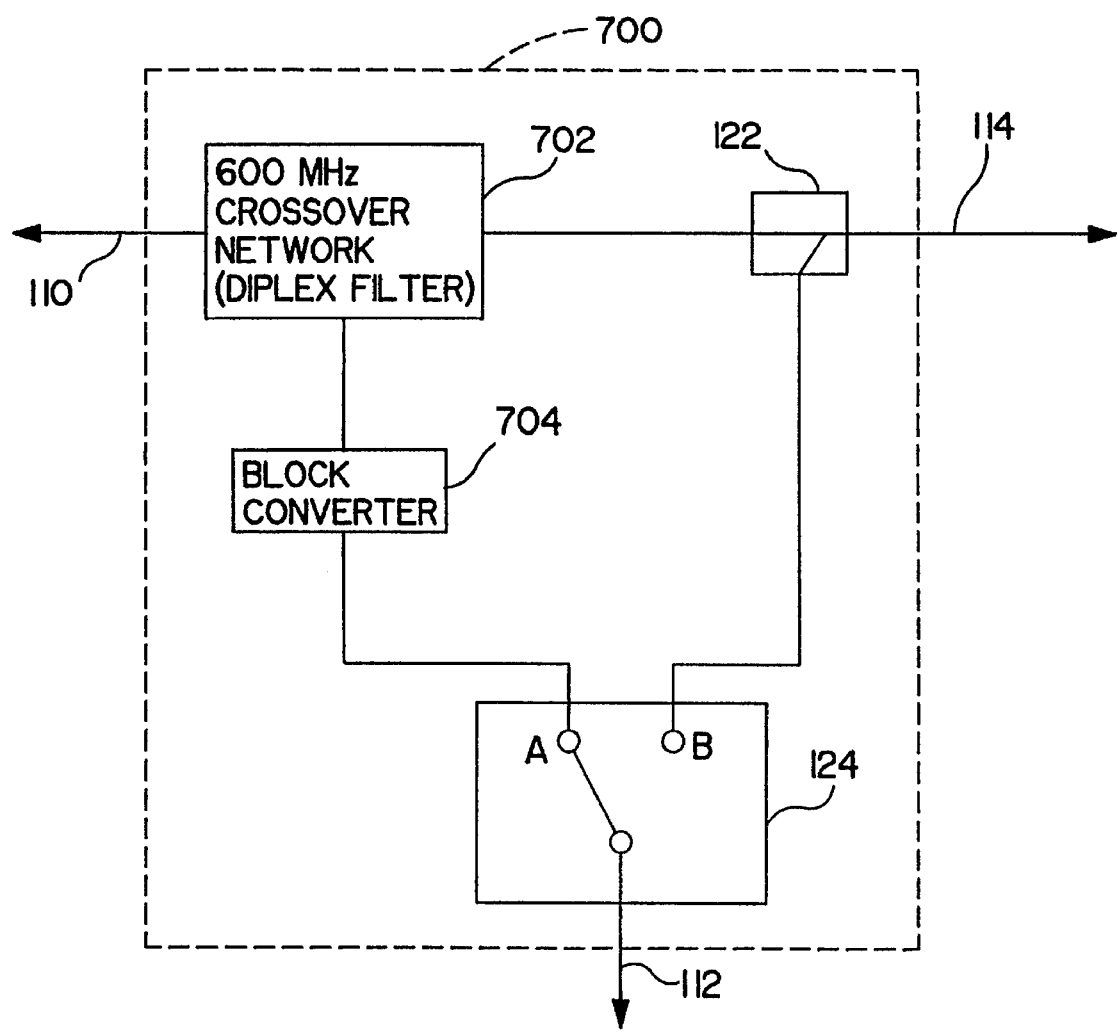
FIG. 7 illustrates a signal selection module for use by a tuned channel detector with a set top converter.

FIG. 7 shows an alternative signal selection module 700 for use as a substitute for signal selection module 104 when a set top converter (not shown) is connected to input path 110 before TV 102. Selection module 700 separates the local oscillator signals from the set top converter, ranging from about 668 MHz to about 1258 MHz, and converts them to frequencies selectable by detector tuner 130.

When a set top converter is used, directional coupler 120 may be replaced by a 600 MHz crossover network 702 (a diplex filter), because the TV carrier signals are below 600 MHz while the local oscillator signals leaking back from the set top converter are over 600 MHz. The crossover network 702 passes television carrier signals right to left from communication path 114 to path 110. The crossover network 702 also passes the leaked local oscillator signals which exceed 600 MHz from the communication path 110 to a block converter 704. The block converter 704 converts the local oscillator signals from the set top converter by a preset amount down to a frequency which may be received at detector tuner 130. It should be mentioned that block converter 704 may be avoided if a detector tuner 130 is used which is capable of receiving the higher local oscillator signals from the set top converter.

Figure 8:
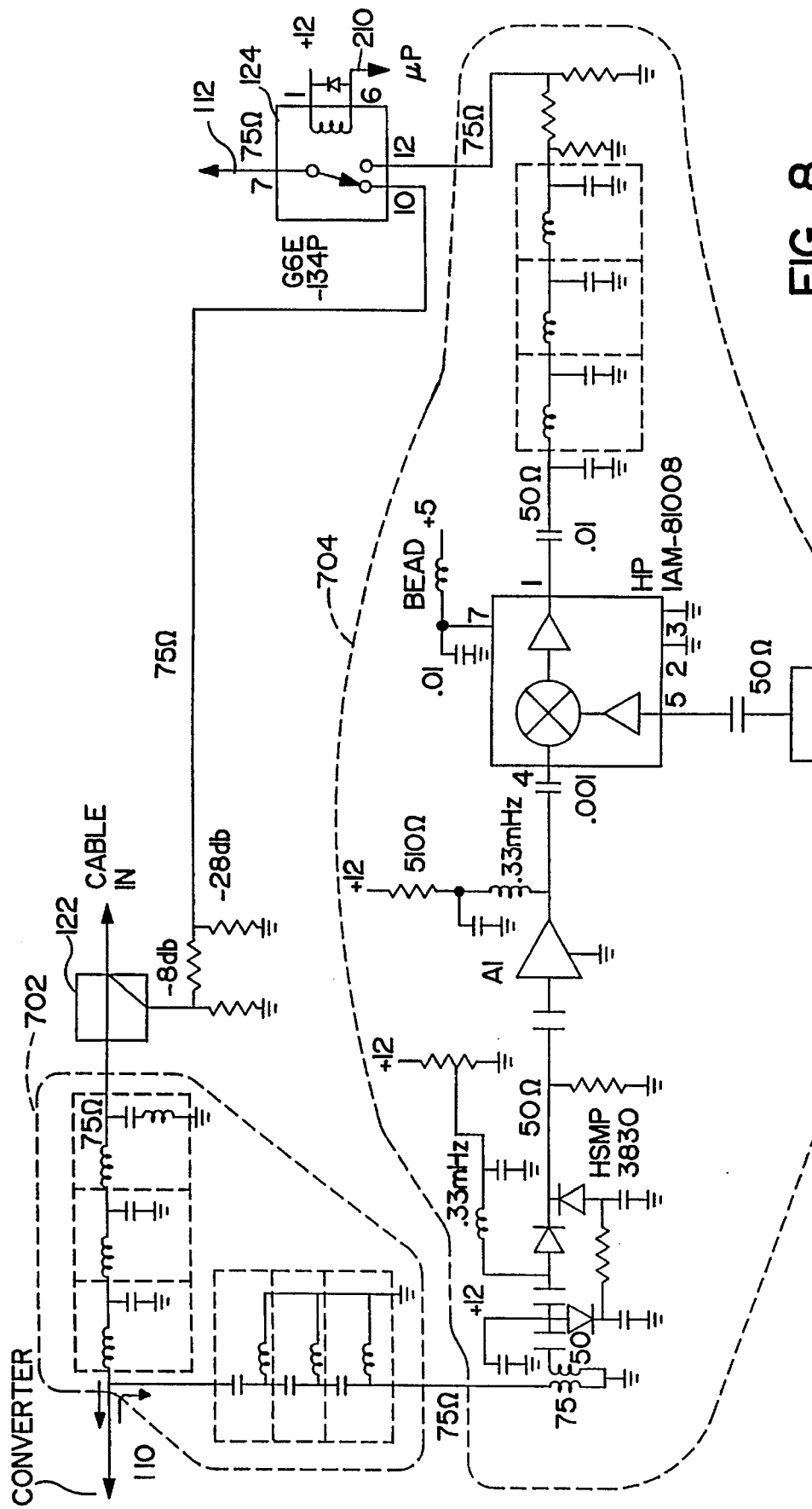
FIG. 8 is a schematic diagram of a signal selection module for use with a set top converter.

FIG. 8 is a detailed schematic diagram implementing the alternative signal selection module shown in FIG. 7 for use with a tuned channel detector when a set top converter is used by the viewer.

With a table-driven software embodiment, the controller 200 accumulates test instructions and apparatus parameters on a per channel basis using tables having such information. The per channel tables represent a segregated database wherein channel specific testing modes are defined. The controller 200 reads each per channel table in sequence; performs the called-for tuned signal testing; determines whether the current per channel corresponds to the tuned channel; then reads the next per channel if the tuned channel has not yet been located. In this way, the controller 200 proceeds through the database of per channel tables until satisfied that the correct channel has been identified. When the controller 200 detects that the channel has been changed at TV 102, then the process is repeated until the new tuned channel is determined by the controller 200.

As an example of the way in which the parameters contained in the per channel tables are used within the table-driven software, channel test data associated with the detection process are contained in sets of per channel tables each having an identical format—one for each channel, corresponding typically to the format shown in TABLE 1 below. The parameters in TABLE 1 are initialized to predetermined values. Except for the tuner values, initial values are the same for all channels. The channel numbers start at entry 02 and go to 108. Within each table are entries which contain specific control parameters for the particular channel.

The following TABLE 1 represents a per channel table entry format for demonstrating the preloading of values used at each tuned channel detector for controlling table-driven software:

TABLE 1

| ENTRY | PARAMETER | |
|---|---|---|
| *1 | ENABLE | Channel enable byte: 00 = SKIP this chan. 01 = TEST this chan. 10 = END of seq.; re-start at 1st chan. |
| 2 | RL ENABLE | Return loss test enable byte: 00 = NO (Local oscillator test this chan.) 11 = YES (Return loss test this chan.) |
| 3 | channel # | Channel to be tested |
| 4 | tuner1 | Tuner control #1 to tune to the picture carrier of the channel in which the local oscillator lies in order to pick up the interfering channel's vertical synchronization interval when in sample mode. |
| *5 | ifctune1 | IF coarse tune |
| 6 | ifftune1 | IF fine tune |
| 7 | rfgain1 | RF gain |
| 8 | ifgain1 | IF gain |
| 9 | tuner2 | Tuner control #2 used to tune to the local oscillator for this channel. |
| *10 | ifctune2 | IF coarse tune |
| 11 | ifftune2 | IF fine tune |
| 12 | rfgain 2 | RF gain |
| *13 | ifgain 2 | IF gain |
| *14 | HIT level | Initial "hit level" setting represents a 2 volt threshold (adjustable). |
| *15 | HIT dev | The deviation above the hit level in which the local oscillator must lie to be a "hit". |
| 16 | sample de | Delay between samples |
| *17 | samples | Samples per vertical sync. (or 60 Hz sync.) |
| 18 | TONE MODE | Tone test |
| *19 | relay | Determines state of relay A/B switch during sync. detect cycle. |
| *20 | SEL 60 HZ | Bypasses the vertical synchronization interval detect cycle and uses the 60 Hz line for sync. |

*denotes parameters which may need to be changed for a particular channel. The other entries typically are not usually changed.

The above TABLE 1 is intended for use with software represented by the program flow chart shown in FIG. 9 (described below), which implements the table-driven software scheme using programmable channel detection table entries for channel detection data and parameters for determining the tuned channel.

The parameters set up the detector configuration for measurements at the channel associated with the parameters. Once the detector is configured according to the table parameters, measurements are then made by the channel detector for local oscillator signals and/or for TV channel carrier signals at the various frequencies which are being considered. In addition, each table entry provides information specific to the channel under consideration. More particularly, information relating to the best method of tuned channel detection for the particular channel, the "hit level," and "hit deviation" are stored for use by the table-driven software.

Many of the table parameters are preloaded and usually do not need to be changed. Some parameters, however, will need to be adjusted depending upon the local oscillator frequency, signal level and/or signal-to-noise level. Such adjustments are facilitated through the training software. Channel parameter entries having an asterisk(*) denote the parameters which may require some adjustment. As the program associated with controller 200 proceeds in accordance with the table-driven software scheme, the parameters associated with each channel are used by controller 200 in determining how to proceed with its testing.

To look for the local oscillator for the TV 102, the controller 200 scans through all the channel table entries for a "match," displays the channel number on numeric display 220, lights a green light at the lamps 222, and logs the appropriate channel number either in a data structure associated with microprocessor 202, or to terminal 218, or to the central control computer 206 via the data path 204. The detector continues to monitor the local oscillator signal until it disappears, at which time the detector turns off the green light at the lamps 222 and then seeks out the next tuned channel.

The enable parameter tells the controller 200 whether to skip the particular channel associated with the table, or whether to test the channel, or whether the detector has reached the end of the test sequence and should restart the loop (usually at channel 2). The return loss enable parameter tells the detector whether to use return loss or local oscillator testing for channel detection. By using a program to call up all of the channel table entries in sequential order, the controller 200 merely loops through all of the candidate channels, tests them, and logs them accordingly.

The channel # parameter represents the channel number (2–108) associated with the particular channel table entry. The tuner1 parameters are used to tune the picture carrier of the interfering channel in which the local oscillator lies in order to pick up the channel's vertical synchronization interval when using the vertical synchronization interval sampling, or to tune in the picture carrier signals for the return loss mode of testing. The next parameters relate to the IF coarse tune, IF fine tune, RF gain, and IF gain, associated with the tuner1 configuration. Then, tuner2 is used to tune the local oscillator for the particular channel under test. The next four parameters relate to parameters associated with IF coarse tune, IF fine tune, mixer RF gain, and mixer IF gain for the tuner2 configuration.

The remaining parameters in the channel table relate to the criteria for determining the tuned channel and the particular testing method. The "hit level" parameter represents an initial setting of 2 volts as the threshold for determining the presence of the local oscillator signal. The "hit level" may be changed to be more or less than 2 volts. The "hit deviation" parameter represents the deviation above the hit level in which the local oscillator signal must lie in order to be considered to be a "hit." The next parameter determines the delay between sampling when the sample mode of testing is used, and the parameter after that relates to the number of samples per vertical synchronization interval or 60 Hz sync. The "tone mode" parameter instructs the tuned channel detector to use the tone method of testing for the particular channel associated with the table. The "relay" parameter determines the state of the switch 124 during the vertical synchronization interval detect cycle associated with detecting the vertical synchronization interval and the generation of the "pseudo-sync" referred to above. Finally, the "elect 60 Hz" bypasses the vertical synchronization interval detect cycle and uses the 60 Hz line for synchronization during the sampling mode of testing. This may be done to stabilize the picture carrier signal measurement.

Figure 9:
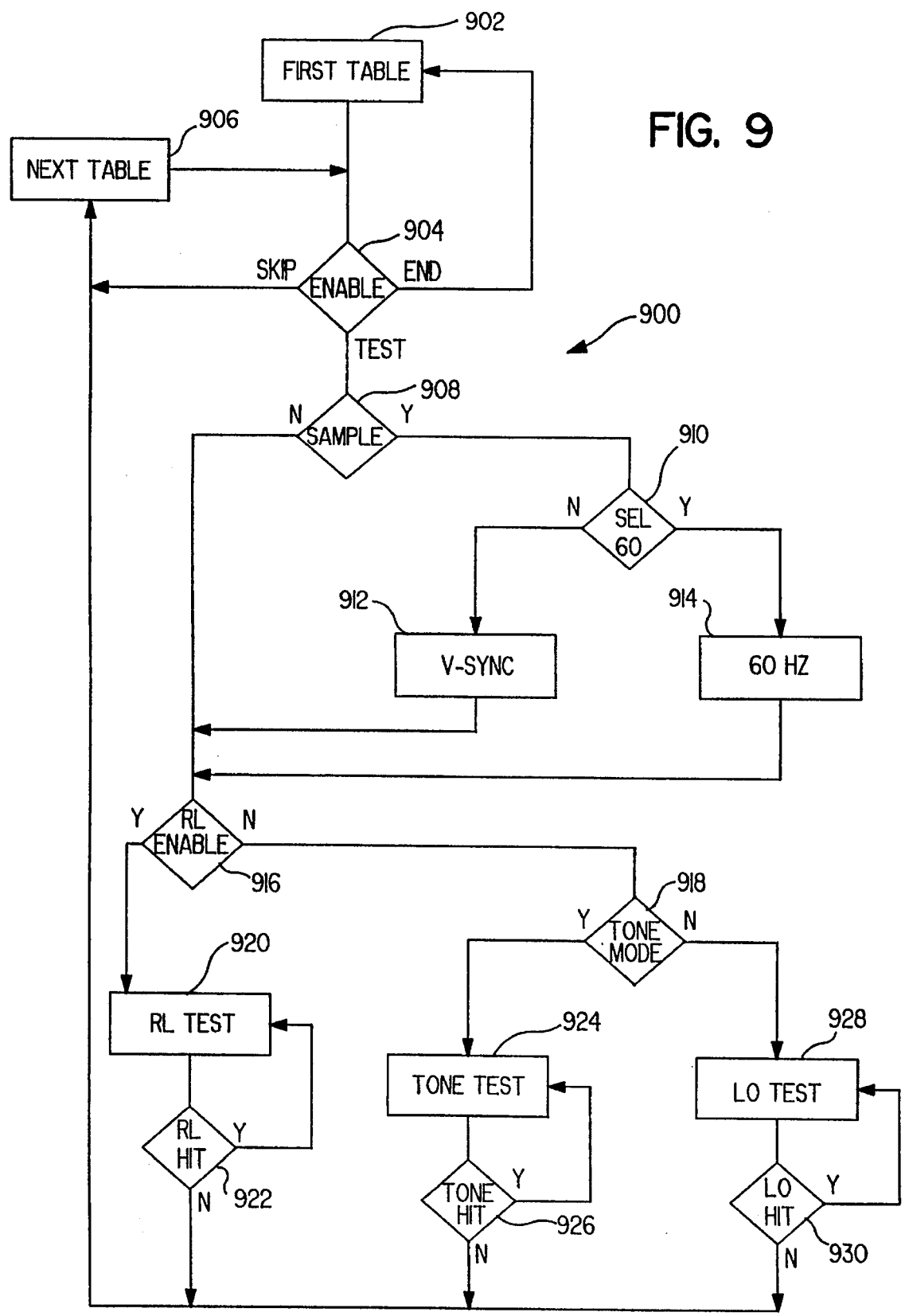
FIG. 9 is a program flow chart for table-driven software which uses programmable channel detection table entries for channel detection data and parameters in accordance with the present invention.

The program flow chart of FIG. 9 further illustrates the table-driven software. The controller 200 uses the above-described table entries so the program flow chart shown generally at 900 is able to detect the tuned channel. The program flow starts at the FIRST TABLE 902, at which point the controller 200 reads the table associated with the first channel to be tested and its associated parameters to configure the tuned channel detector and then proceeds accordingly. Typically the first channel will be channel 2, however it has been found advantageous to configure a channel table entry 01 chosen as a thermal compensation channel for running recalibration routines since there usually is not a channel 1. The tuner values in the table are not actually for channel 1 however, rather any channel which is good for making thermal compensation adjustments will suffice (in one embodiment channel 7 was used).

Next ENABLE 902 checks for one of three table entries: skip, test, or end. End causes the microprocessor 202 to re-start at FIRST TABLE 902. Skip causes the controller 200 to proceed to NEXT TABLE 906 which increments an index to the next table. Test causes the microprocessor 202 to proceed with testing for the channel associated with the present table. SAMPLE 908 determines whether or not a sample mode of testing is to be employed. If a sampling mode is to be used, SEL__60 910 determines whether 60 Hz sampling should be used. V-SYNC 912 configures the detector apparatus for vertical synchronization interval sampling if 60 Hz sampling is not used, otherwise 60__HZ 914 configures the apparatus for 60 Hz sampling. RL__ENABLE 916 determined whether return loss testing is to be used, and if not TONE__MODE 918 determines whether tone testing for local oscillator is to be used.

The actual testing for tuned channel detection is carried out at RL__TEST 920, TONE__TEST 924, and LO__TEST 928. When a tuned channel is detected with one test, it may be verified with another test to ensure proper detection. Channel hits are detected at RL__HIT 922, TONE__HIT 926, and LO__HIT 930. As can be seen from the program flow chart 900, once a tuned channel is detected, the channel is repeatedly tested until the channel changes at which time the next table is selected and the above-described program loop is then repeated. The described table-driven software scheme is merely a simplified and basic example of the way in which tuned channel detection is implemented; numerous modifications and enhancements should be readily apparent to those skilled in the art.

In particular, an alternative "mixed mode" of tuned channel detection has been found useful as an adjunct to regular local oscillator testing. In this mode, selected channels are singled out for return loss testing. All other channels will be local oscillator tested. One reason for doing this is that for particular channels the local oscillator signal may be too low to be detected reliably, or there may be an extraneous signal that could be confused for an local oscillator signal. In the mixed mode, selected channels are individually return loss tested as scanning occurs. As already discussed, another alternative is to use the various types of testing as checks against one another to ensure accurate detection. Basically, the program flow illustrated in FIG. 9 is merely a core upon which higher level programs used by the controller 200 can build in order to develop more sophisticated testing schemes.

In conjunction with the table-driven software and artificial intelligence techniques referred to above, the tuned channel detector system undergoes a process of "system training." Training is defined as that process by which the system "learns" the attributes of the TV 102 operating in a specific environment. This can be done manually for each detector system or through a process of self-training which uses artificial intelligence programming techniques in software.

Manual training involves stepping the TV 102 through each of the active channels. The detector system logs into the controller 200 all the attributes for each channel. These attributes will then be used during the "run" mode to identify which channel is being tuned. The software for this is relatively straightforward.

Self-training involves artificial intelligence techniques whereby the controller 200 starts with certain assumptions, then adds to its knowledge through trial and error. The disadvantage of self-training is that its error rate tends to be quite high initially and improves with time. The software must keep track of various trend data. Another type of self-training that can significantly improve detect time is to build a "profile" of the viewer's habits. Most viewers have quite definite viewing habits or patterns. Such viewing patterns can be exploited by testing for the viewer's most likely channels first. Some of the attributes stored for each channel would thus include: which channels are active on the system; the reflection coefficient for each signal; the local oscillator frequency and amplitude for each signal; and whether local oscillator amplitude, tone, or sampling mode detection is preferable.

One should keep in mind that either the return loss or local oscillator methods of testing may be used to determine the channels to which the TV 102 is tuned, or some combination of the methods may also be used to ensure accurate detection. Unless the local oscillator signal is extremely low or buried in noise, local oscillator testing is generally faster than return loss testing, because often the picture carriers used for return loss measurements have to be sampled only during the vertical retrace interval, when the carriers are fairly constant (no picture content). Also, either vertical synchronization interval sampling or line synchronization sampling may be used with the amplitude or tone local oscillator methods, and such sampling may also be used with the return loss method as well. Artificial intelligence techniques may also be used to exploit optimal detection methods based upon particular testing conditions and adversities.

While there has been described the preferred embodiments of the present invention, numerous modifications and changes will naturally be apparent to those skilled in the art. It is therefore intended by the appended claims to define all such modifications and changes as fall within the spirit and scope of the invention.

What is claimed is:

1. A continuous wave detection apparatus for detecting the presence of a low level continuous waveform amplitude within an input signal comprising the low level continuous waveform and an interfering signal, said apparatus comprising:

a source of a first periodic signal;

means for frequency modulating said first periodic signal with a second periodic signal producing a frequency modulated signal;

means for frequency shifting the input signal by a frequency corresponding to the frequency modulated signal;

filtering means for selecting a signal within a predetermined range of frequencies from the frequency shifted input signal; and means for detecting said second periodic signal in the signal selected by said filtering means to identify the presence of said low level continuous waveform therein.

2. The apparatus of claim 1, wherein said means for frequency shifting comprises means for shifting the input signal by a sweep of frequencies.

3. The apparatus of claim 1 wherein said second periodic signal comprises a periodic triangular waveform.

4. The apparatus of claim 1, wherein the detecting means comprises a synchronous rectifier synchronized with said second periodic signal; and wherein the apparatus comprises means for integrating a rectification timing signal of said synchronous rectifier to generate said second periodic signal.

5. The apparatus of claim 4 wherein the apparatus comprises controller means for comparing the signal output from said synchronous rectifier to a predetermined signal threshold to discern the presence of said low level continuous waveform.

6. A tuned signal detection apparatus for use with a television receiver tuned by a local oscillator signal to a tuned one of a plurality of incoming television signals demarcated by vertical synchronization intervals; said local oscillator signal having a different predetermined frequency for tuning said receiver to different ones of said incoming television signals, said tuned signal detection apparatus comprising:

means for receiving a signal representing the local oscillator signal generated by said receiver;

means for selecting an individual one of said incoming television signals;

means for detecting the vertical synchronization intervals for the selected incoming television signal; and controller means responsive to said detecting means for measuring, only during the vertical synchronization intervals from the selected incoming television signal, the local oscillator signal generated by said receiver for tuning the tuned one of the plurality of incoming television signals.

7. The apparatus of claim 6, wherein said selecting means comprises controller means for identifying an individual one of said incoming television signals interfering with said local oscillator signal, and controller means for selecting said television signal interfering with said local oscillator signal.

8. A tuned signal detection apparatus for use with a television receiver for tuning to one of a plurality of television signals, the television receiver generating local oscillator signals having a different predetermined frequency for tuning said receiver to each of said plurality of television signals, the local oscillator signals being modulated by a 60 Hertz power line signal, said tuned signal detection apparatus comprising:

means for detecting a synchronized sampling point in 60 Hertz power line modulation cycles; and controller means responsive to said detecting means for identifying the presence of one of the local oscillator signals having a frequency for tuning said receiver to a particular one of said plurality of television signals, only during the synchronized sampling point in 60 Hertz power line modulation cycles.

9. A tuned signal detection system for detecting one of a plurality of television signals to which a television tuner is tuned, said plurality of television signals comprising a scrambled television signal, said detection system comprising:

means at a location remote from said television tuner for receiving said plurality of television signals and for measuring vertical synchronization timing intervals from the scrambled television signal thereof;

means for sending a synchronizing signal identifying said measured timing intervals from said remote location to a tuned signal detection device local to said television tuner; and means, at said tuned signal detection device, responsive to said synchronizing signal for detecting one of a plurality of television signals in synchronism with said timing intervals measured at said remote location.

* * * * *